(12) United States Patent
Wang

(10) Patent No.: US 11,397,538 B2
(45) Date of Patent: Jul. 26, 2022

(54) DATA MIGRATION METHOD AND APPARATUS

(71) Applicant: Huawei Technologies Co., Ltd., Shenzhen (CN)

(72) Inventor: Ying Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 30 days.

(21) Appl. No.: 17/150,219

(22) Filed: Jan. 15, 2021

(65) Prior Publication Data

US 2021/0132850 A1 May 6, 2021

Related U.S. Application Data

(63) Continuation of application No. PCT/CN2019/076835, filed on Mar. 4, 2019.

(30) Foreign Application Priority Data

Jul. 18, 2018 (CN) .......................... 201810791979.7

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0652* (2013.01); *G06F 3/0653* (2013.01)

(58) Field of Classification Search
CPC .... G06F 3/0647; G06F 3/0604; G06F 3/0652; G06F 3/0653; G06F 3/067; G06F 3/0619; G06F 3/0649; G06F 3/0625
See application file for complete search history.

(56) References Cited

U.S. PATENT DOCUMENTS

| 2011/0286123 A1 * | 11/2011 | Montgomery .......... G06F 3/061 360/15 |
| 2015/0355837 A1 | 12/2015 | Bish et al. |
| 2017/0139613 A1 * | 5/2017 | Zhu ..................... G06F 11/1469 |

FOREIGN PATENT DOCUMENTS

| CN | 107643880 A | * | 1/2018 | ............... G06F 3/06 |
| CN | 107643880 A | | 1/2018 | |
| CN | 108228102 A | | 6/2018 | |
| CN | 108234641 A | | 6/2018 | |
| CN | 109271098 A | | 1/2019 | |

* cited by examiner

*Primary Examiner* — Masud K Khan
(74) *Attorney, Agent, or Firm* — Slater Matsil, LLP

(57) ABSTRACT

This disclosure provides a data migration method and apparatus. The method includes: obtaining, by a first node from a second node, to-be-migrated data and a version number of the to-be-migrated data; obtaining from a third node, a version number of data that belongs to a same first service as the to-be-migrated data, wherein the data of the first service is distributively stored in the second node and the third node; and discarding the to-be-migrated data read from the second node when the first node determines that the version number of the to-be-migrated data obtained from the second node is different from a version number of data obtained from the third node.

20 Claims, 7 Drawing Sheets

# DATA MIGRATION METHOD AND APPARATUS

CROSS-REFERENCE TO RELATED APPLICATIONS

This application is a continuation of International Application No. PCT/CN2019/076835, filed on Mar. 4, 2019, which claims priority to Chinese Patent Application No. 201810791979.7, filed on Jul. 18, 2018. The disclosures of the aforementioned applications are hereby incorporated by reference in their entireties.

TECHNICAL FIELD

This disclosure relates to the field of storage technologies, and in particular, to a data migration method and apparatus.

BACKGROUND

With rapid increase of internet users and diversified development of services, more data (such as user data and service configuration data) needs to be stored by using a storage system to facilitate service analysis and service guidance. A clustered storage system has large capacity and is easy to scale, and therefore is widely used in data storage.

FIG. 1A shows an architecture of a clustered storage system. In FIG. 1, a management node A and three storage nodes are deployed in the clustered storage system, and are respectively marked as a node 1, a node 2, and a node 3. A plurality of network logical storage units (NLUN) are configured in the clustered storage system. For example, an NLUN 1 and an NLUN 2 may be configured in the clustered storage system, where each NLUN is used to store specific data. For example, the NLUN 1 is used to store video data, the NLUN 2 is used to store text data, and the management node A is configured to manage and maintain a member disk of each NLUN and data in each member disk. In this way, after the clustered storage system receives to-be-stored data, the management node A determines, based on a type of the to-be-stored data, whether to store the to-be-stored data in the NLUN 1 or the NLUN 2. For each NLUN, several disks may be selected from each storage node as member disks of the NLUN, so that all data corresponding to the NLUN is stored in the member disks of the NLUN. For example, two disks are selected from each storage node as member disks of the NLUN 1. Member disks on the node 1 are marked as a disk 1 and a disk 2, member disks on the node 2 are marked as a disk 3 and a disk 4, and member disks on the node 3 are marked as a disk 5 and a disk 6. In this way, a set of the member disks of the NLUN 1 is {1, 2, 3, 4, 5, 6}.

After a capacity of the clustered storage system is expanded, as shown in FIG. 1B, a storage node is added to the clustered storage system and is marked as a node 4. The management node A replaces a member disk of one or more NLUNs with a disk on the node 4. For example, the management node A replaces the disk 6 of the NLUN 1 on the node 3 with a disk 7 of the node 4. In this case, the set of the member disks of the NLUN 1 changes to {1, 2, 3, 4, 5, 7}. Then, the management node A instructs the node 4 to migrate data in a source disk to a target disk, for example, migrate data in the disk 6 to the disk 7.

A data migration process is transparent to a user, and therefore the user does not know that the NLUN 1 is being in the data migration process. As such, when the NLUN 1 performs data migration, a data deletion instruction delivered by the user may be received. In this case, if to-be-deleted data has not been migrated from the disk 6 to the disk 7, after receiving the deletion instruction, the node 4 determines that the to-be-deleted data is not found in the disk 7, and determines that the data deletion instruction is executed. After the node 4 determines that the data deletion instruction is executed, data has been migrated from the disk 6 to the disk 7. In this case, the to-be-deleted data is stored in the disk 7. This results in data remanence.

To resolve the data remanence, after receiving the data deletion instruction, the node 4 records the data deletion instruction in a deletion log of the node 4. After the data migration is completed, the node 4 replays the data deletion instruction, to delete the residual data.

It can be learned that in the foregoing solution, the to-be-deleted data is first migrated from the source disk to the target disk, and the data is deleted after the data is migrated to the target disk. In this process, an input/output interface resource for one time of data reading, an input/output interface resource for one time of data writing, and an input/output interface resource for one time of data deletion are wasted. This wastes many resources.

SUMMARY

Embodiments of this disclosure provide a data migration method and apparatus, to reduce resources consumed when data is deleted in a data migration process.

According to a first aspect, an embodiment of this disclosure provides a data migration method. The method includes: in a process in which a second node migrates data to a first node, first reading, by the first node from the second node, to-be-migrated data and a version number of the to-be-migrated data, and reading, by the first node from at least one third node, a version number of data that belongs to a same first service as the to-be-migrated data, where the data of the first service is distributively stored in the second node and the at least one third node; and then when the first node determines that the version number of the to-be-migrated data read from the second node is different from a version number of data read from any one of the third node, discarding, by the first node, the to-be-migrated data read from the second node.

In the foregoing technical solution, during data migration, the version number of the to-be-migrated data and a version number of data that is in another node and that belongs to a same service as the to-be-migrated data are compared, to filter out to-be-deleted data. This can reduce a waste of I/O resources for ineffective migration and subsequent deletion.

Further, because the waste of I/O resources for ineffective migration and subsequent deletion can be reduced, impact of a data migration process on a service can be reduced, and migration performance and reliability can be improved.

In a possible design, before reading, from the second node, the to-be-migrated data and the version number of the to-be-migrated data, and reading, from the at least one third node, the version number of the data that belongs to the same first service as the to-be-migrated data, the first node receives a deletion instruction used to instruct the first node and the at least one third node to delete the data corresponding to the first service. The first node determines that the version number of the to-be-migrated data read from the second node is a positive integer, and determines that the version number of the data read from any one of the third node does not exist.

In the foregoing technical solution, during data migration, an operation instruction may be received. When the first node receives the deletion instruction before reading the version number of the data of the first service from the second node, the at least one third node also receives the deletion instruction. In this case, the at least one third node separately deletes the stored data of the first service. In this way, after a deletion operation is performed, the data of the first service does not exist in each disk of the at least one third node, and the version number that is of the data of the first service and that is read from any one of the third node does not exist. The data in the second node needs to be migrated, and therefore the second node does not deliver the received deletion instruction to a disk to which the data is migrated. Therefore, the version number that is of the data of the first service and that is read by the first node from the second node is a version number before the operation is performed, and the two version numbers are different.

In a possible design, before reading, from the second node, the to-be-migrated data and the version number of the to-be-migrated data, and reading, from the at least one third node, the version number of the data that belongs to the same first service as the to-be-migrated data, the first node receives a rewrite instruction used to instruct the first node and the at least one third node to rewrite the data corresponding to the first service. The first node determines that the version number of the data read from any one of the third node is greater than the version number of the to-be-migrated data read from the second node.

In the foregoing technical solution, during data migration, an operation instruction may be received. When the first node receives the rewrite instruction before reading the version number of the data of the first service from the second node, the at least one third node also receives the rewrite instruction. In this case, the at least one third node separately rewrites the stored data of the first service. In this way, after a rewrite operation is performed, the version number of the data of the first service in each disk of the at least one third node increases. The data in the second node needs to be migrated, and therefore the second node does not deliver the received rewrite instruction to a disk to which the data is migrated. Therefore, the version number that is of the data of the first service and that is read by the first node from the second node is a version number before the operation is performed, and the version number that is of the data of the first service and that is read by the first node from the second node is less than the version number that is of the data of the first service and that is read from any one of the third node.

In a possible design, when reading, from the second node, the to-be-migrated data and the version number of the to-be-migrated data, and reading, from the at least one third node, the version number of the data that belongs to the same first service as the to-be-migrated data, the first node receives an operation instruction used to instruct the first node and the at least one third node to delete or rewrite the data corresponding to the first service. The first node caches an operation version number carried in the operation instruction. If the first node determines that the version number of the to-be-migrated data read from the second node is the same as the version number of the data read from any one of the third node, and determines that the version number of the to-be-migrated data read from the second node is less than the cached operation version number, the first node discards the to-be-migrated data read from the second node.

In the foregoing technical solution, during data migration, the operation instruction may be received. When the first node receives the operation instruction at a same moment at which the first node reads the version number of the data of the first service from the at least one third node, the at least one third node also receives the rewrite instruction. How-ever, the at least one third node has not executed the operation instruction. Therefore, the version number read by the first node from each disk of the at least one third node is a version number of the data of the first service before an operation. The data in the second node needs to be migrated, and therefore the second node does not deliver the received rewrite instruction to a disk to which the data is migrated. Therefore, the version number that is of the data of the first service and that is read by the first node from the second node is a version number before the operation is performed, and the version number that is of the data of the first service and that is read by the first node from the second node is equal to the version number that is of the data of the first service and that is read from any one of the third node. In this case, the first node may compare the read version number of the data of the first service with the operation version number of the operation instruction. If the read version number of the data of the first service is less than the operation version number of the operation instruction, the data that is of the first service and that is read by the first node from the second node is old data. Discarding the data can resolve data remanence caused by concurrency.

In a possible design, the first node first determines, from the at least one third node, a node in a trusted state, where the trusted state is a state that a disk for storing the data of the first service is not faulty, and data in the disk for storing the data of the first service is complete; and then reads, from the node in the trusted state, the version number of the data that belongs to the same first service as the to-be-migrated data.

In the foregoing technical solution, the first node reads, from the node in the trusted state, the version number of the data that belongs to the same service as the to-be-migrated data. Therefore, accuracy of the read version number can be ensured.

In a possible design, the first node first determines, from the at least one third node, node in the trusted state, where the trusted state is a state that the disk for storing the data of the first service is not faulty, and the data in the disk for storing the data of the first service is complete; then determines, a node with a minimum load from the node in the trusted state; and reads, from the node with the minimum load, the version number of the data that belongs to the same first service as the to-be-migrated data.

In the foregoing technical solution, the first node reads, from the node with the minimum load and in the trusted state, the version number of the data that belongs to the same first service as the to-be-migrated data. Therefore, accuracy of the read version number can be ensured, and a delay of reading the version number can be reduced.

According to a second aspect, an embodiment of this disclosure provides a data migration apparatus. The apparatus includes a processor, configured to implement the method according to the first aspect. The apparatus may further include a memory, configured to store a program instruction and data. The memory is coupled to the processor. The processor may invoke and execute the program instruction stored in the memory, to implement the method according to the first aspect. The apparatus may further include a communications interface, and the communications interface is configured by the apparatus to communicate with another device. For example, the another device includes the second node or the at least one third node in the first aspect.

In a possible design, the apparatus includes the communications interface and the processor. Specifically, in a process in which a second node migrates data to the apparatus through the communications interface, the processor reads, from the second node through the communications interface, to-be-migrated data and a version number of the to-be-migrated data, and reads, from at least one third node, a version number of data that belongs to a same first service as the to-be-migrated data, where the data of the first service is distributively stored in the second node and the at least one third node. When determining that the version number of the to-be-migrated data read from the second node is different from a version number of data read from any one of the third node, the processor discards the to-be-migrated data read from the second node.

In a possible design, the processor is further configured to: before reading, from the at least one third node, the version number of the data that belongs to the same first service as the to-be-migrated data, receive a deletion instruction through the communications interface. The deletion instruction is used to instruct the apparatus and the at least one third node to delete the data corresponding to the first service, and the first node is the apparatus or a node on which the apparatus is located. When determining that the version number of the to-be-migrated data read from the second node is different from the version number of the data read from any one of the third node, the processor is specifically configured to: determine that the version number of the to-be-migrated data read from the second node is a positive integer; and determine that the version number of the data read from any one of the third node does not exist.

In a possible design, the processor is further configured to: before reading, from the at least one third node, the version number of the data that belongs to the same first service as the to-be-migrated data, receive a rewrite instruction through the communications interface. The rewrite instruction is used to instruct the apparatus and the at least one third node to rewrite the data corresponding to the first service, and the first node is the apparatus or a node on which the apparatus is located. When determining that the version number of the to-be-migrated data read from the second node is different from the version number of the data read from any one of the third node, the processor is specifically configured to: determine that the version number of the data read from any one of the third node is greater than the version number of the to-be-migrated data read from the second node.

In a possible design, when the processor is further configured to: when reading, from the at least one third node, the version number of the data that belongs to the same first service as the to-be-migrated data, receive an operation instruction through the communications interface, where the operation instruction is used to instruct the apparatus and the at least one third node to delete or rewrite the data corresponding to the first service, and the first node is the apparatus or a node on which the apparatus is located; cache an operation version number carried in the operation instruction; when determining that the version number of the to-be-migrated data read from the second node is the same as the version number of the data read from any one of the third node, determine whether the version number of the to-be-migrated data read from the second node is less than the cached operation version number; and if the version number of the to-be-migrated data read from the second node is less than the cached operation version number, discard the to-be-migrated data read from the second node.

In a possible design, when reading, from the at least one third node, the version number of the data that belongs to the same first service as the to-be-migrated data, the processor is specifically configured to: determine, from the at least one third node, a node in a trusted state, where the trusted state is a state that a disk for storing the data of the first service is not faulty, and data in the disk for storing the data of the first service is complete; and then read, from the node in the trusted state, the version number of the data that belongs to the same first service as the to-be-migrated data.

In a possible design, when reading, from the at least one third node, the version number of the data that belongs to the same first service as the to-be-migrated data, the processor is specifically configured to: determine, from the at least one third node, node in the trusted state, where the trusted state is a state that the disk for storing the data of the first service is not faulty, and the data in the disk for storing the data of the first service is complete; then determine a node with a minimum load from the node in the trusted state; and read, from the node with the minimum load, the version number of the data that belongs to the same first service as the to-be-migrated data.

According to a third aspect, an embodiment of this disclosure provides a data migration apparatus. The apparatus may be a first node, or may be an apparatus in a first node. The apparatus may include an obtaining unit and a processing unit. These modules may perform corresponding functions in any design example of the first aspect. In addition, these modules may be implemented by using a software module, or may be implemented by using a corresponding hardware entity. For example, when the modules are implemented by using the corresponding hardware entity, a function of the obtaining unit is similar to a function of the communications interface in the second aspect, and a function of the processing unit is similar to a function of the processor in the second aspect.

According to a fourth aspect, an embodiment of this disclosure provides a computer-readable storage medium. The computer-readable storage medium stores a computer program, the computer program includes a program instruction, and when the program instruction is executed by a computer, the computer is enabled to perform the method in any one of the first aspect.

According to a fifth aspect, an embodiment of this disclosure provides a computer program product. The computer program product stores a computer program, the computer program includes a program instruction, and when the program instruction is executed by a computer, the computer is enabled to perform the method in any one of the first aspect.

According to a sixth aspect, this disclosure provides a chip system. The chip system includes a processor, may further include a memory, and is configured to implement the method according to the first aspect. The chip system may include a chip, or may include a chip and another discrete component.

For beneficial effects of the second aspect to the sixth aspect and the implementations of the second aspect to the sixth aspect, refer to the descriptions of the beneficial effects of the method in the first aspect and the implementations of the first aspect.

DETAILED DESCRIPTION OF ILLUSTRATIVE EMBODIMENTS

To make objectives, technical solutions, and advantages of embodiments of this disclosure clearer, the following describes the technical solutions in the embodiments of this disclosure in detail with reference to accompanying drawings in this specification and specific implementations.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects, unless otherwise noted.

In addition, it should be understood that "a plurality of" in the embodiments of this disclosure means "two or more". Words such as "first" and "second" are merely used for distinction and description, and shall not be understood as an indication or implication of relative importance or an indication or implication of a sequence.

An embodiment of this disclosure provides a data migration method. The method is applied to a clustered storage system. The clustered storage system may be a file storage system, a block storage system, an object storage system, or a combination of the storage systems. This is not limited in this embodiment of this disclosure.

Figure 1A:
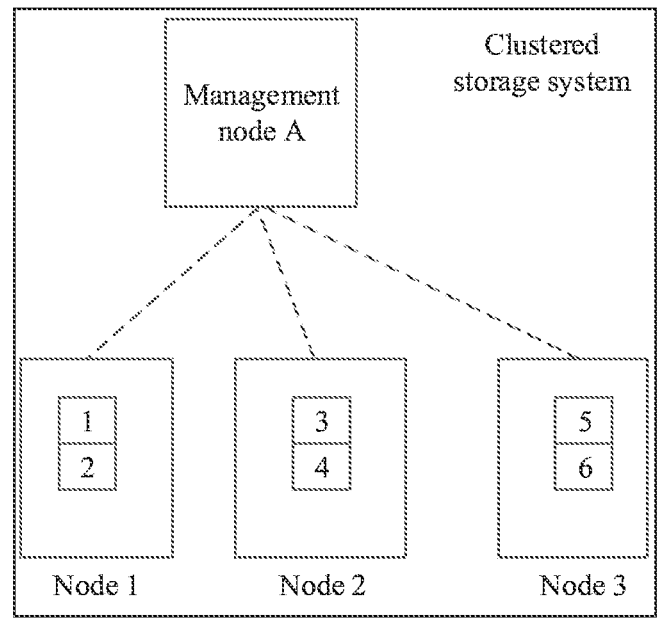
FIG. 1A is a possible architectural diagram of a clustered storage system according to an embodiment of this disclosure.
Figure 2A:
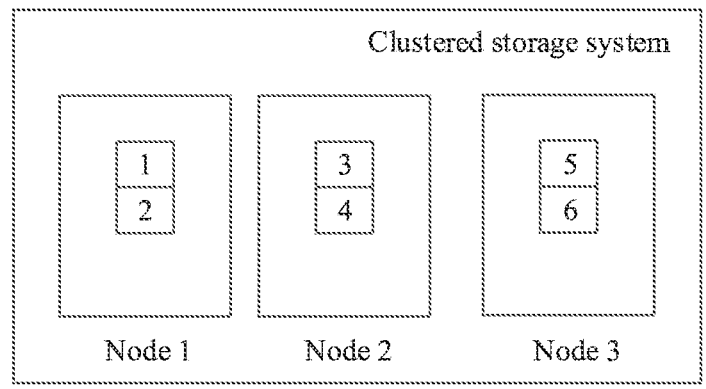
FIG. 2A is another possible architectural diagram of a clustered storage system according to an embodiment of this disclosure.
Figure 2B:
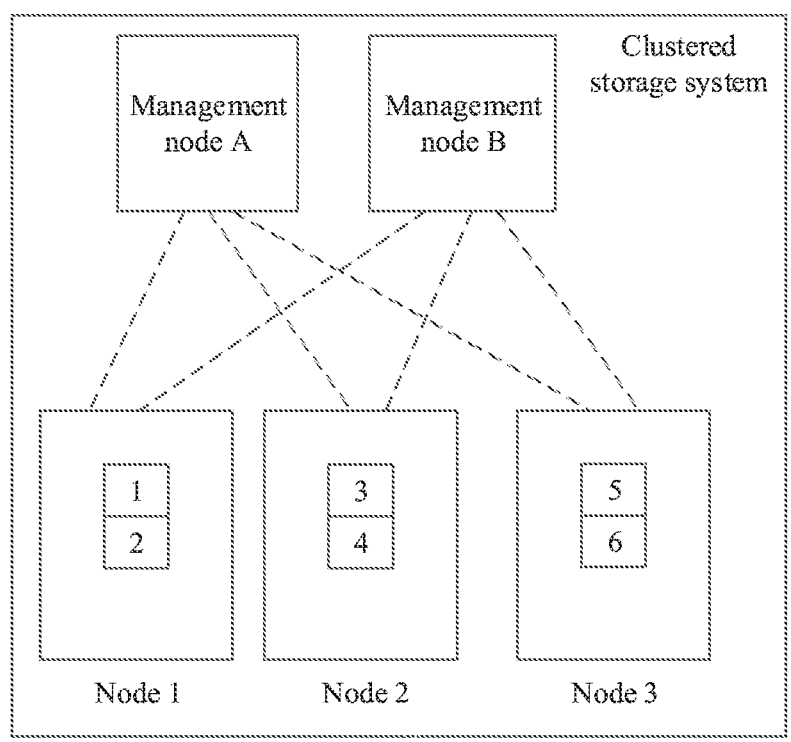
FIG. 2B is still another possible architectural diagram of a clustered storage system according to an embodiment of this disclosure.

FIG. 1A, FIG. 2A, and FIG. 2B are three possible architectural diagrams of a clustered storage system. A clustered storage system shown in FIG. 1A has been described above, and details are not described herein. Different from the clustered storage system shown in FIG. 1A, a clustered storage system shown in FIG. 2A includes only a plurality of storage nodes used to store data, and the plurality of storage nodes constitute a coupled node set, to provide a service externally in a coordinated manner. As shown in FIG. 2A, the clustered storage system includes a storage node 1 to a storage node 3, and each storage node processes data in a same manner. After obtaining to-be-stored data, the clustered storage system stores the to-be-stored data in each storage node. For example, each storage node stores all content of the to-be-stored data. This is equivalent to replicating the to-be-stored data into three copies, and each storage node stores one of the three copies.

Different from architectures shown in FIG. 1A and FIG. 2A, an architecture shown in FIG. 2B includes a plurality of management nodes, for example, a management node A and a management node B. In this way, when a management node in a clustered storage system is faulty, the clustered storage system may still provide, by using another management node, a service for a client interacting with the clustered storage system.

It should be noted that the clustered storage system is not limited to the architectures shown in FIG. 1A, FIG. 2A, and FIG. 2B. The clustered storage systems described in the embodiments of this disclosure are intended to describe the technical solutions in the embodiments of this disclosure more clearly, and do not constitute limitations on the technical solutions provided in the embodiments of this disclosure. A person of ordinary skill in the art may learn that, with evolution of a storage technology and a storage system architecture, the technical solutions provided in the embodiments of this disclosure are also applicable to similar technical problems.

In addition, the clustered storage systems shown in FIG. 1A, FIG. 2A, and FIG. 2B may store data in the following two manners. The clustered storage system shown in FIG. 1A is used as an example for description. In a first manner, after a management node A of the clustered storage system obtains to-be-stored data, the management node A may replicate the to-be-stored data into a plurality of copies, for example, three copies, and then respectively store the copies of the data on different storage nodes. For example, the three copies of the data may be stored on a node 1 to a node 3. In this way, when a failure of a storage node in the clustered storage system causes a loss of the stored data, the data may be obtained from another storage node. In a second manner, after a management node A of the clustered storage system obtains to-be-stored data, the management node A divides the to-be-stored data into a plurality of pieces, and then encodes each piece of data obtained through division, to obtain a plurality of data fragments, and respectively stores the plurality of data fragments on different storage nodes. In this way, when a failure of a storage node in the clustered storage system causes a loss of the stored data, the management node A may reconstruct the to-be-stored data based on a data fragment stored on another storage node. Certainly, the clustered storage system may alternatively store data in another manner. This is not limited herein.

Figure 1B:
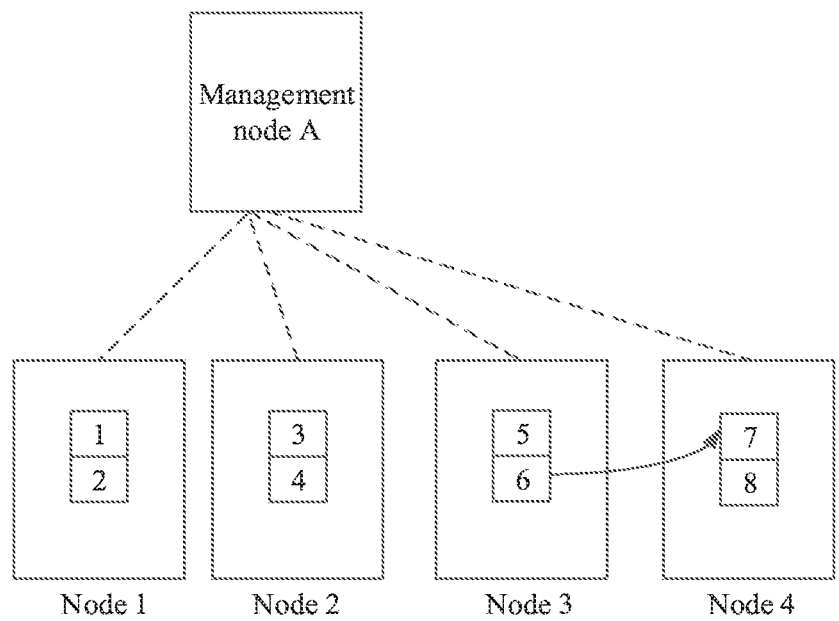
FIG. 1B is a schematic diagram of data migration performed by using a clustered storage system according to an embodiment of this disclosure.

The clustered storage systems shown in FIG. 1A, FIG. 2A, and FIG. 2B support capacity expansion of the storage systems. A specific capacity expansion manner is shown in FIG. 1B, and details are not described herein. After a capacity of a clustered storage system is expanded, some data on an original storage node needs to be migrated to a new storage node. After a clustered storage system in a data migration process receives an instruction for deleting a piece of data, because a source disk for storing the data does not receive the deletion instruction, the data remains in a target disk.

Figure 3:
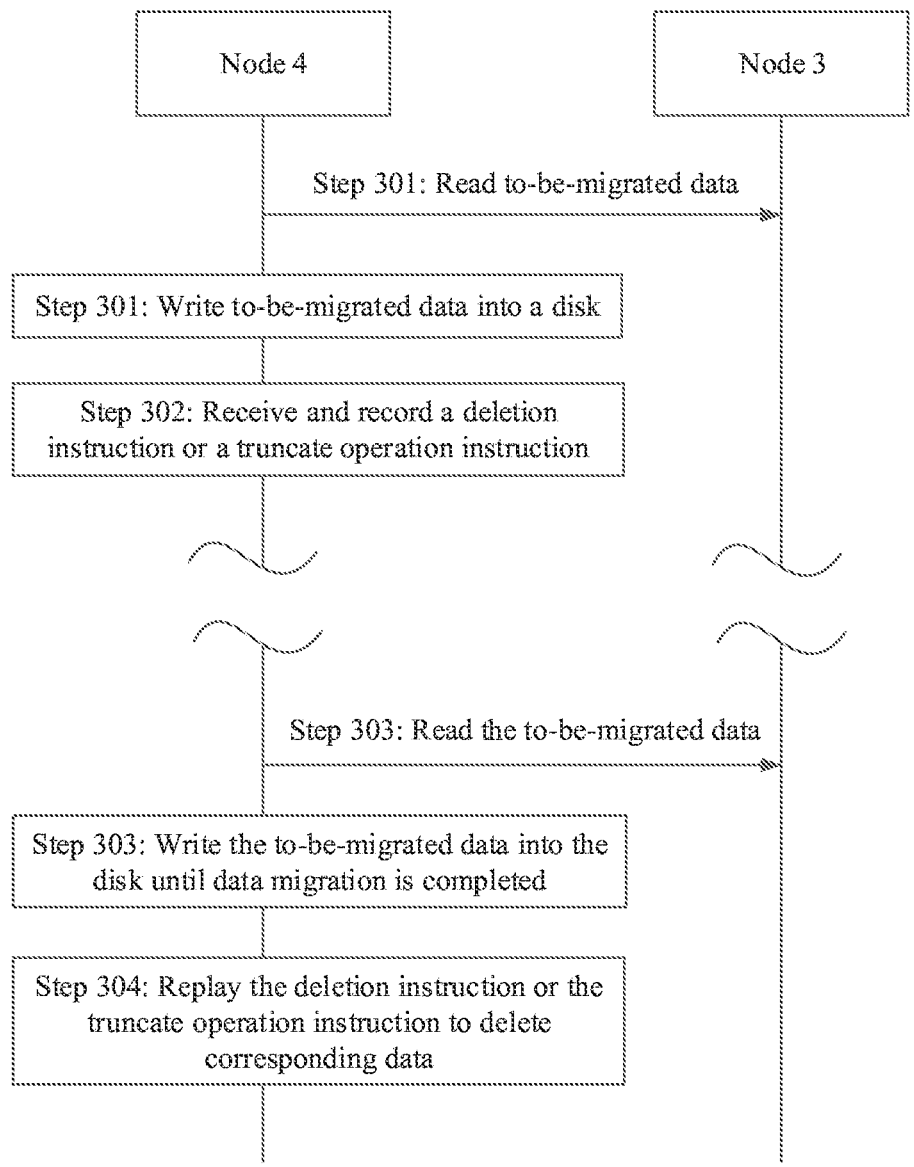
FIG. 3 is a flowchart of a data migration process.

Referring to FIG. 3, to resolve data remanence, a clustered storage system uses the following processing manner. A data migration process shown in FIG. 1B is used as an example.

Step 301: A node 4 (a newly added node) reads to-be-migrated data from a disk 6 and writes the read data into a disk 7.

Step 302: In a process in which the node 4 reads the to-be-migrated data from the disk 6 and writes the read data into the disk 7, the node 4 receives a deletion instruction or a truncate operation instruction that is delivered by a management node A and that is used to delete data A. In this case, if the node 4 determines that the data A is not stored in the disk 7, the node 4 records the deletion instruction or the truncate operation instruction in a delete log.

Step 303: The node 4 continues to read the to-be-migrated data from the disk 6 and stores the to-be-migrated data in the disk 7 until all data in the disk 6 is migrated to the disk 7, to complete data migration.

Step 304: The node 4 replays the deletion instruction or the truncate operation instruction recorded in the delete log, to delete the data A stored in the disk 7.

In the foregoing processing manner, to avoid remanence of the data A in the disk 7, in a process of migrating the data A from the disk 6 to the disk 7, the node 4 wastes an input/output interface resource for one time of data reading and an input/output interface resource for one time of data writing. When deleting the data A from the disk 7, the node 4 wastes an input/output interface resource for one time of data deleting. It can be learned that many resources are wasted.

In view of this, an embodiment of this disclosure provides a data migration method, to reduce resources consumed when data is deleted in a data migration process. The following describes the technical solutions provided in the embodiments of this disclosure with reference to the accompanying drawings.

Figure 4:
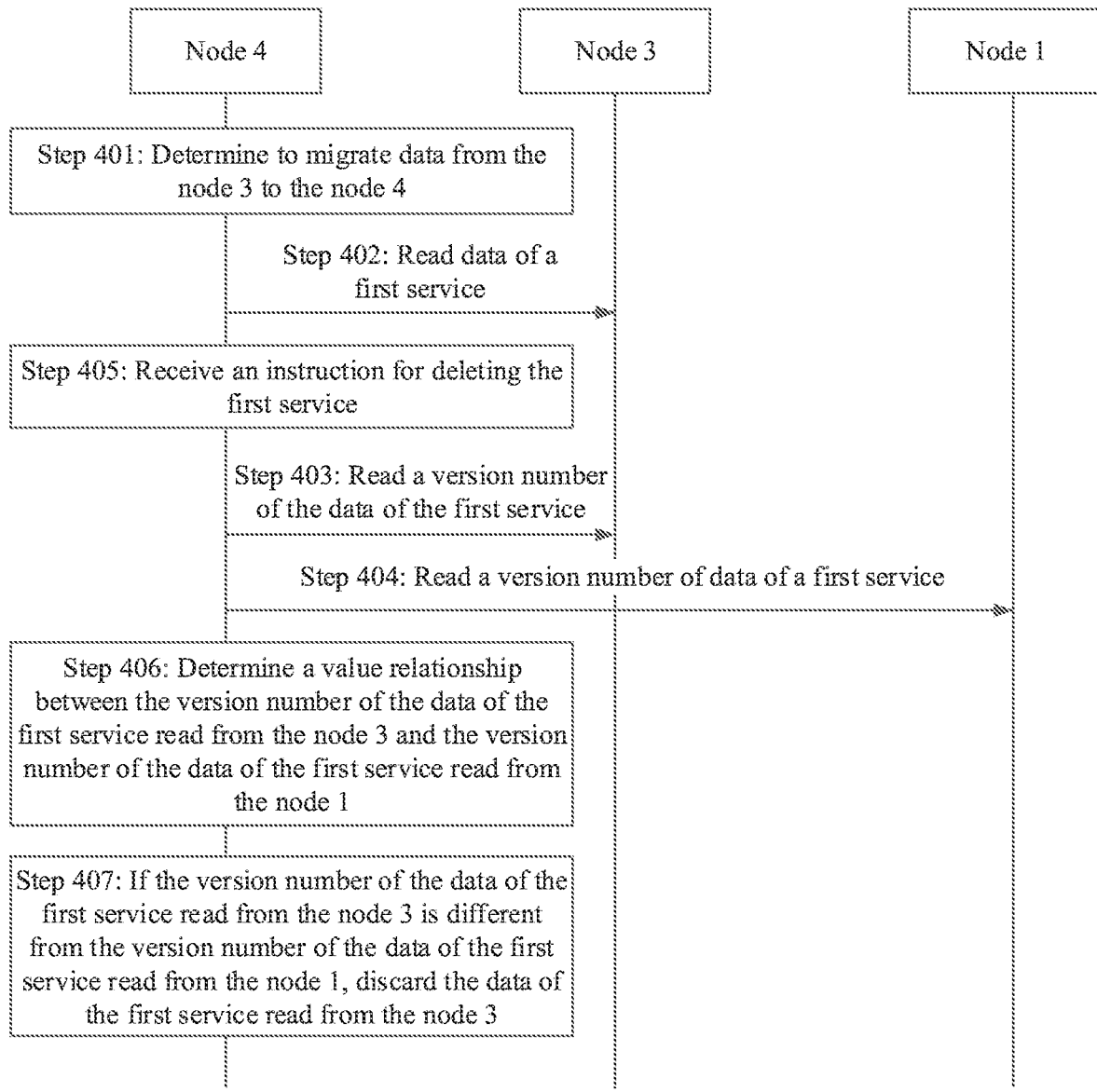
FIG. 4 is a flowchart of an example of a data migration method according to an embodiment of this disclosure.

FIG. 4 is a flowchart of a data migration method according to an embodiment of this disclosure. A procedure includes the following steps.

Step 401: A first node determines that a second node migrates data to the first node.

In this embodiment of this disclosure, the first node is a storage node on which a target disk to which the data is to be migrated is located, the first node may be a newly added node in a storage system, and the second node is a storage node on which a source disk from which the data is migrated is located. For ease of description, in the following description process, the data migration method provided in this disclosure is applied to the clustered storage system shown in FIG. 1A.

When a capacity of the clustered storage system needs to be expanded, a management node A determines to migrate data in a disk of an original storage node to a disk of a new storage node. For example, as shown in FIG. 1B, a node 4 is added, and the management node determines to migrate data in a disk 6 of a node 3 to a disk 7 of the node 4. Alternatively, because of a predetermined policy, for example, to ensure data storage balance, the management node A determines to migrate a part of data in a disk whose remaining storage space is less than a threshold to a disk whose remaining storage space is relatively large. In these cases, the management node A sends an instruction to the storage node on which the target disk to which the data is to be migrated is located. The instruction may carry an identifier of the source disk and an identifier of the storage node on which the source disk is located. In this way, after the storage node in which the target disk is located receives the instruction, a data migration process is determined. Certainly, data migration may alternatively be triggered by another reason. This is not limited in this disclosure.

In the following description, a data migration process shown in FIG. 1B is used as an example. In the data migration process shown in FIG. 1B, because the node 4 is newly added to the clustered storage system, the management node A determines to migrate the data in the disk 6 to the disk 7. In this case, in the following process, an example in which the first node is the node 4 on which the disk 7 is located and the second node is the node 3 on which the disk 6 is located is used. The management node A sends an instruction to the node 4. After receiving the instruction, the node 4 determines that the data in the disk 6 of the node 3 needs to be migrated to the disk 7.

Step 402: The node 4 reads to-be-migrated data from the node 3.

After the node 4 determines that the data in the disk 6 of the node 3 needs to be migrated to the disk 7, the node 4 reads the to-be-migrated data from the disk 6. A manner in which the node 4 reads the to-be-migrated data from the node 3 includes but is not limited to the following two manners.

A First Read Manner:

The management node A presets a size of a transmission unit used when data migration is performed between storage nodes in the clustered storage system. For example, the management node A sets the size of the transmission unit to 10 MB. In this case, the node 4 sequentially reads data of 10 MB starting from a start storage location of the disk 6, and when the data of 10 MB is migrated, the node 4 reads next data of 10 MB from the disk 6.

A Second Read Manner:

The management node A presets a size of a time unit used to read data when data migration is performed between storage nodes in the clustered storage system. For example, the management node A sets the size of the time unit to 2s. In this case, the node 4 reads data from the disk 6 within 2 s each time starting from a start storage location of the disk 6. For example, the node 4 reads data of 20 MB from the disk 6 within 2 s, and after the data of 20 MB is migrated, the node 4 reads next data within 2 s from the disk 6. It should be noted that if performance of the node 4 does not change, sizes of data read by the node 4 in the time unit each time are the same. For example, the node 4 reads data of 20 MB within 2 s from the disk 6 for the first time. In this case, a size of data read by the node 4 each time is 20 MB. If the performance of the node 4 changes, for example, when an amount of data stored in the node 4 is larger, the performance is lower. In this case, if the node 4 reads the data of 20 MB within 2 s from the disk 6 for the first time, a size of data read by the node 4 at an Nth time may be less than 20 MB.

Because performance of storage nodes in the clustered storage system may be different, sizes of to-be-migrated data read each time when different storage nodes perform data migration are different. For example, the node 4 can read data of 20 MB each time when reading the to-be-migrated data from another storage node. However, performance of a node 2 is lower than that of the node 4. Therefore, the node 2 may read data of 10 MB each time when reading the to-be-migrated data from the another storage node. This can improve flexibility of the data migration process.

Step 403: The node 4 reads a version number of the to-be-migrated data from the node 3.

In an example, the node 4 reads data of 10 MB from the disk 6 in the first read manner in step 402. The data of 10 MB is data of a first service, and a version number of the data of 10 MB is carried in the data. In this case, the node 4 directly reads the corresponding version number from the data, and to be specific, the node 4 obtains a version number of the data of the first service, for example, 2.

In another example, data may not carry a version number of the data. Therefore, after reading data of 10 MB from the disk 6 of the node 3, the node 4 may first determine a service to which the data of 10 MB belongs. For example, the data of 10 MB belongs to a first service. Then, the node 4 obtains, from the disk 6 of the node 3, a version number of the data of the first service, for example, 2.

It should be noted that, in this embodiment of this disclosure, a sequence of performing step 402 and step 403 is not limited. Step 402 may be performed before step 403, or step 402 and step 403 may be performed simultaneously. In other words, when reading the to-be-migrated data from the node 3, the node 4 synchronously obtains the version number of the to-be-migrated data.

In addition, if the node 4 reads the data of 10 MB from the disk 6 in the first read manner in step 402, the data of 10 MB may not belong to a same service. For example, data of first 5 MB in the data of 10 MB belongs to the first service, and data of last 5 MB belongs to a second service. In this case, the node 4 reads two version numbers of the to-be-migrated data from the node 3, and the two version numbers are respectively a version number of the data of the first service and a version number of the data of the second service that are stored in the disk 6. Certainly, when the data of 10 MB includes data of three or more services, a quantity of version numbers of the to-be-migrated data read by the node 4 from the node 3 is also three or more. In this embodiment of this disclosure, the quantity of version numbers of data read by the node 4 from the node 3 each time may be one or more. This is not limited herein.

Step 404: The node 4 reads, from at least one third node, a version number of data that belongs to a same service as the to-be-migrated data.

The following describes the third node. In this embodiment of this disclosure, the third node may be another node in the clustered storage system other than the node on which the source disk from which the data is migrated is located and the node on which the target disk to which the data is to be migrated is located. An application scenario shown in FIG. 1B is used as an example. The clustered storage system includes a node 1 to the node 4, and the node 3 and the node 4 are respectively nodes on which the disk 6 and the disk 7 are located. Therefore, the third node is the node 1 and/or the node 2. In this case, a quantity of third nodes may be 1 or 2. Certainly, if the clustered storage system further includes another node, for example, a node 5 or a node 6, the quantity of third nodes may also be more than 2. Alternatively, if the clustered storage system includes only three nodes, for example, the node 2 to the node 4, the third node is the node 2. In this case, the quantity of third nodes is 1.

In the clustered storage system, data of each service is stored in an NLUN in a distributed storage manner. Data of a service A is used as an example. When the data of the service A is stored in the clustered storage system, the management node A of the clustered storage system determines, based on a type of the service A, to store the data of the service A in an NLUN 1. A set of member disks of the NLUN 1 includes disks {1, 2, 3, 4, 5, 6}. Therefore, the management node A divides the data of the service A into six data blocks, and then respectively stores the six data blocks in the member disks of the NLUN 1. Each data block may carry an identifier of the service A. In this way, when the management node A needs to obtain the data of the service A, the management node A only needs to read, from each member disk, a data block that carries the identifier of the service A.

When the quantity of third nodes is two or more, a method in which the node 4 reads, from the at least one third node, the version number of the data that belongs to the same service as the to-be-migrated data includes but is not limited to the following three cases. An example in which the third node includes the node 1 and the node 2 is used.

A First Case:

The node 4 reads, from each third node, the version number of the data that belongs to the same service as the to-be-migrated data. For example, the node 4 reads the data of 10 MB from the disk 6 in the first read manner in step 402, and then the node 4 determines that the data of 10 MB carries an identifier of the first service, for example, the identifier of the service A. In this case, the node 4 separately reads a version number of the data of the service A from the node 1, and reads the version number of the data of the service A from the node 2.

A Second Case:

The node 4 reads, from a node in a trusted state in the at least one third node, the version number of the data that belongs to the same service as the to-be-migrated data. In this embodiment of this disclosure, the trusted state is a state that a disk for storing the data of the service is not faulty, and data in the disk for storing the data of the service is complete.

Specifically, the trusted state may be determined by the management node A in the clustered storage system. For example, the management node A may send, in a scheduled polling manner, one piece of self-defined information, for example, a heartbeat packet or a heartbeat frame, to each node in the clustered storage system. If the management node A can receive, from a node, feedback information corresponding to the self-defined information, it is considered that the node is not faulty. Alternatively, each node in the clustered storage system may send self-defined information at a specific time interval. After receiving the self-defined information, the management node A determines that the node is not faulty. Specific content of the self-defined information may be content agreed upon by the management node A and each node, or may be an empty packet including only a packet header. This is not limited herein. Each node may report a status of each disk on the node to the management node A, and the status of each disk may include a normal state and a faulty state. If a disk can provide services of a read operation and a write operation, the disk is in the normal state. If a disk cannot provide a service of a read operation or a service of a write operation, the disk is in the faulty state. The management node A may determine, based on the disk status reported by each node, whether the disk is faulty. Certainly, if a node is faulty, the management node A determines that each disk on the node is faulty. In addition, when the management node A controls data migration between two disks, for example, when the management node A controls the node 4 to migrate the data in the disk 6 of the node 3 to the disk 7, the management node A determines that data in the two disks on which data migration is performed is incomplete, and determines that data in a disk on which data migration does not occur is complete.

After obtaining the foregoing information, the management node A determines, based on the foregoing information, whether each node is in the trusted state. In this embodiment of this disclosure, a manner in which the management node A determines whether each node is in the trusted state may include but is not limited to the following two manners.

In a first determining manner, if no disk on a node is faulty and data on each disk is complete, the management node A may mark the node as the trusted state. If a disk on a node is faulty or data on each disk is incomplete, the management node A marks the node as an untrusted state.

In a second determining manner, the management node A determines a trusted state of each node for each service based on the foregoing information. For example, for the service A, disks used to store the data of the service A are a disk 1 to a disk 5. The disk 1 and the disk 2 are disks on the node 1, the disk 3 and the disk 4 are disks on the node 2, and the disk 5 is a disk on the node 3. If the management node A determines that the disk 1 is faulty, and that the disk 2 to the disk 5 are not faulty and data is complete, nodes that are in the trusted state and that are for the service A are the node 2 and the node 3. Because the faulty disk 1 exists on the node 1, the node 1 is in the untrusted state. In this case, even if data migration occurs in the disk 6 of the node 3, the node 3 is still in the trusted state for the service A because the disk 6 does not store the data of the service A.

The management node A may determine and record the status of each node in one of the foregoing two determining manners, where the status is the trusted state or the untrusted state. The management node A may send the status of each node to each node, or each node may query the status from the management node A. Certainly, because the disk status may change in real time, the status that is of each node and that is determined by the management node A also needs to be updated in real time. A specific update method is not limited in this embodiment of this disclosure.

In this case, a process in which the node 4 reads, from the node in the trusted state in the at least one third node, the version number of the data that belongs to the same service as the to-be-migrated data is as follows: The node 4 reads the data of 10 MB from the disk 6 in the first read manner in step 402, and determines that the data carries an identifier of the service A. Then, the node 4 determines, by using the management node A, that both the node 1 and the node 2 are in the trusted state, and the node 4 reads a version number of the data of the service A from the node 1 and reads the version number of the data of the service A from the node 2.

The node 4 reads, from the node in the trusted state, the version number of the data that belongs to the same service as the to-be-migrated data. Therefore, accuracy of the read version number can be ensured.

A Third Case:

The node 4 reads, from a node with a minimum load and in a trusted state in the at least one third node, the version number of the data that belongs to the same service as the to-be-migrated data.

In this case, a definition and a determining manner of the trusted state are the same as corresponding content in the second case of step 404, and details are not described herein.

The management node A may further collect statistics on and record a load of each node. For example, the load may be a size of data stored on each node. The management node A may send the load of each node to each node, or each node may query the load of the node from the management node A. Certainly, because the load changes in real time, the management node A also needs to update the recorded load of each node in real time. A specific update method is not limited in this embodiment of this disclosure.

In this case, a process in which the node 4 reads, from the node with the minimum load and in the trusted state in the at least one third node, the version number of the data that belongs to the same service as the to-be-migrated data is as follows: The node 4 reads the data of 10 MB from the disk 6 in the first read manner in step 402, and determines that the data carries an identifier of the service A. Then, the node 4 determines, by using the management node A, that both the node 1 and the node 2 are in the trusted state, and a load of the node 1 is the smallest. In this case, the node 4 reads a version number of the data of the service A from the node 1.

The node 4 reads, from the node with the minimum load and in the trusted state, the version number of the data that belongs to the same service as the to-be-migrated data. Therefore, accuracy of the read version number can be ensured, and a delay of reading the version number can be reduced.

For ease of description, in the following description, an example in which the node 4 reads the version number of the to-be-migrated data from the node 3 and reads a version number of the data that belongs to the same service as the to-be-migrated data from a node with the minimum load and in the trusted state in the at least one third node is used.

It should be noted that, in this embodiment of this disclosure, the quantity of version numbers of the data read by the node 4 from the node 3 each time is the same as a quantity of version numbers of data read by the node 4 from the node 1 each time. That is, in step 403, if the node 4 reads one version number of the to-be-migrated data from the node 3, correspondingly, the node 4 also reads one version number of the data that belongs to the same service as the to-be-migrated data from the node 1. If the node 4 reads a plurality of version numbers of the to-be-migrated data from the node 3, correspondingly, the node 4 also reads a plurality of version numbers of the data that belongs to the same service as the to-be-migrated data from the node 1.

In addition, to reduce a data migration delay, step 403 and step 404 may alternatively be performed simultaneously. An execution sequence of step 403 and step 404 is not limited in this embodiment of this disclosure.

Step 405: The node 4 receives an instruction delivered by a user for performing an operation on the data of the first service.

The data migration process is transparent to the user, and therefore the user does not know whether the clustered storage system is in the data migration process. Therefore, when the data is migrated from the disk 6 of the node 3 to the disk 7 of the node 4, the instruction delivered by the user for performing the operation on the data of the first service may be received. The instruction may be a deletion instruction, and the deletion instruction is used to instruct the node 1 to the node 4 to delete the data corresponding to the first service. The instruction may alternatively be a rewrite instruction, and the rewrite instruction is used to instruct the node 1 to the node 4 to rewrite the data corresponding to the first service. Certainly, the instruction may alternatively be another instruction. In this embodiment of this disclosure, an example in which the instruction is the deletion instruction is used for description.

It should be noted that the instruction does not affect step 403 and step 404 performed by the node 4. To be specific, when the disk 6 of the node 3 starts to migrate the data to the disk 7 of the node 4, step 403 to step 404 have already started to be performed. However, the instruction in step 405 is used to perform an operation on the data that is of the first service and that is stored in the clustered storage system. Therefore, if the first service is stored in the NLUN 1 in the clustered storage system, the management node A delivers the instruction to a node on which each member disk of the NLUN 1 is located. Before the instruction is delivered, the disk set of the member disks of the NLUN 1 has been updated from the set {0, 1, 2, 3, 4, 5, 6} to a set {0, 1, 2, 3, 4, 5, 7}. Therefore, after receiving the instruction, the node 3 does not deliver the instruction to the disk 6. After receiving the instruction, another member disk of the NLUN 1 performs a corresponding operation on the data of the first service, for example, deletes the data of the first service or rewrites the data of the first service. To be specific, when the node 4 receives the instruction, it indicates that a node on which the another member disk of the NLUN 1 is located also receives the instruction. In this case, after the another node performs the operation on the data of the first service, a version number of the data changes. Therefore, step 405 affects an execution result of step 404. The following describes impact of step 405 on the execution result of step 404.

In this embodiment of this disclosure, referring to FIG. 4, the node 4 performs step 405 before performing step 403 and step 404, to be specific, the node 4 receives the instruction before reading the version number of the data of the first service from the node 1. In addition, an example in which the instruction is the deletion instruction used to instruct to delete the data of the first service is used for description.

When the node 4 receives the deletion instruction, the node 1 to the node 3 also receive the deletion instruction. Therefore, the node 1 to the node 3 separately delete the data that is of the first service and that is stored in the disk 1 to the disk 5. After a deletion operation is performed, the data of the first service does not exist in each disk. Therefore, a version number of the data of the first service does not exist in each of the disk 1 to the disk 5. If the version number of the data of the first service is obtained in step 404, the execution result of step 404 is that the version number of the data of the first service does not exist.

Step 406: The node 4 determines a value relationship between the version number of the to-be-migrated data read from the node 3 and the version number of the data read from the node 1.

An example in which the to-be-migrated data read by the node 4 from the disk 6 of the node 3 is the data of the first service is used. Because the data in the disk 6 needs to be migrated to the disk 7, the node 3 does not deliver the received deletion instruction to the disk 6. Therefore, the version number of the data of the first service in the disk 6 is a version number before an operation is performed. For example, the version number of the data of the first service before the operation is performed is 2. In addition, the version number that is of the data of the first service and that is read by the node 4 from the node 1 does not exist. In this case, the node 4 determines that the version number of the to-be-migrated data read from the node 3 is different from the version number of the data read from the node 1.

Step 407: When determining that the version number of the to-be-migrated data read from the node 3 is different from the version number of the data read from the node 1, the node 4 discards the to-be-migrated data read from the node 3.

Still referring to FIG. 4, if the node 4 determines that the version number of the to-be-migrated data read from the node 3 is different from the version number of the data read from the node 1, it is considered that the data of the first service read by the node 4 from the disk 6 of the node 3 is old data. Therefore, the read data of the first service is discarded.

It should be noted that the to-be-migrated data read by the node 4 from the disk 6 may include data of different services. For example, the data of first 5 MB in the data of 10 MB belongs to the first service, and the data of last 5 MB in the data of 10 MB belongs to the second service. If the node 4 determines that the version number of the data of the first service read from the node 3 is different from the version number of the data of the first service read from the node 1, but the version number of the data of the second service read from the node 3 is the same as a version number of data of a second service read from the node 1, the node 4 discards only the read data that is of the first service and that is in the to-be-migrated data. For example, the node 4 discards the data of first 5 MB in the data of 10 MB, and writes the data of last 5 MB in the data of 10 MB into the disk 7.

Then, the node 4 continues to read the to-be-migrated data from the disk 6 by using the foregoing method until data migration is completed.

In the foregoing technical solution, during data migration, the version number of the to-be-migrated data and a version number of data that is in another node and that belongs to a same service as the to-be-migrated data are compared, to filter out to-be-deleted data. This can reduce a waste of I/O resources for ineffective migration and subsequent deletion. Further, because the waste of I/O resources for ineffective migration and subsequent deletion can be reduced, impact of a data migration process on a service can be reduced, and migration performance and reliability can be improved.

Different operation instructions have different impact on a version number of data stored in the clustered storage system. For example, when the clustered storage system receives a deletion operation instruction, the version number of the data does not exist after the data is deleted. When the clustered storage system receives a rewrite operation instruction, the version number of the data increases after the data is rewritten. In the foregoing embodiment, an example in which the operation instruction is the deletion operation instruction is used for description. The following describes a data migration process of a clustered storage system by using an example in which the operation instruction is a rewrite operation instruction.

Figure 5:
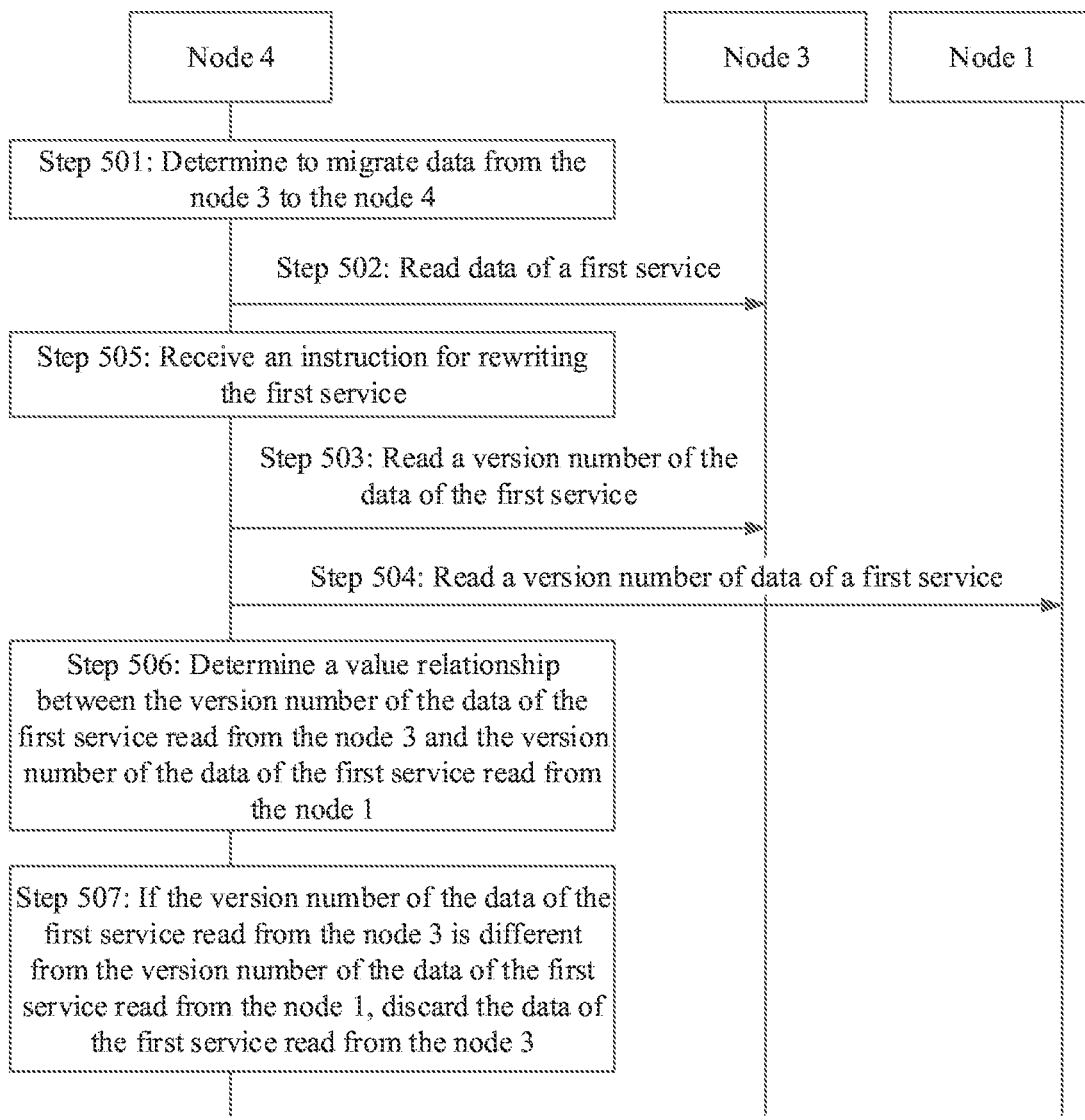
FIG. 5 is a flowchart of another example of a data migration method according to an embodiment of this disclosure.

FIG. 5 is a flowchart of a data migration method according to an embodiment of this disclosure. A procedure includes the following steps.

Step 501: A first node determines that a second node migrates data to the first node.

Step 502: A node 4 reads to-be-migrated data from a node 3.

Step 503: The node 4 reads a version number of the to-be-migrated data from the node 3.

Step 504: The node 4 reads, from at least one third node, a version number of data that belongs to a same service as the to-be-migrated data.

Step 501 to step 504 are the same as step 401 to step 404, and details are not described herein.

Step 505: The node 4 receives an instruction delivered by a user for performing an operation on data of a first service.

An example in which the node 4 performs step 505 before performing step 503 and step 504, to be specific, the node 4 receives the instruction before reading a version number of the data of the first service from a node 1, and the instruction is a rewrite instruction used to instruct to rewrite the data of the first service is used for description.

When the node 4 receives the rewrite instruction, the node 1 to the node 3 also receive the rewrite instruction. Therefore, the node 1 to the node 3 separately rewrite, according to the rewrite instruction, the data that is of the first service and that is stored in each of a disk 1 to a disk 5. It should be noted that the version number of the data of the first service is related to an operation performed by the clustered storage system on the data. Specifically, when the clustered storage system performs a write operation to write the data of the first service into a disk, the version number of the data of the first service in each disk into which the data of the first service is written is 1. Using an example in which a disk set of disks into which the data of the first service is written includes disks {0, 1, 2, 3, 4, 5, 6}, the version number of the data of the first service in each of the disks {0, 1, 2, 3, 4, 5, 6} is 1. Then, if the clustered storage system receives a rewrite operation to rewrite the data of the first service, the version number of the data of the first service in each disk in the disk set {0, 1, 2, 3, 4, 5, 6} is increased by 1, and becomes 2. The others follow the same rule. Each time when the clustered storage system performs an operation on the data of the first service, the version number of the data of the first service in each disk is increased by 1.

In this case, after the rewrite operation is performed, the version number of the data of the first service in each of the disk 1 to the disk 5 is increased by 1. Assuming that the version number of the data of the first service is 2 before the rewrite operation is performed, step 504 is performed after step 505 is performed, in this case, the version number that is of the data of the first service and that is obtained in step 504 is 3.

Step 506: The node 4 determines a value relationship between the version number of the to-be-migrated data read from the node 3 and the version number of the data read from the node 1.

An example in which an execution result of step 504 is that the version number of the data of the first service is 3 and to-be-migrated data read by the node 4 from a disk 6 of the node 3 is the data of the first service is used. Because data in the disk 6 needs to be migrated to a disk 7, the node 3 does not deliver the received rewrite instruction to the disk 6. Therefore, the version number of the data of the first service in the disk 6 is a version number before an operation is performed. For example, the version number of the data of the first service before the operation is performed is 2. In addition, the version number that is of the data of the first service and that is read by the node 4 from the node 1 is 3. In this case, the node 4 determines that the version number of the to-be-migrated data read from the node 3 is less than the version number of the data read from the node 1.

Step 507: When determining that the version number of the to-be-migrated data read from the node 3 is different from the version number of the data read from the node 1, the node 4 discards the to-be-migrated data read from the node 3.

Still referring to FIG. 5, if the node 4 determines that the version number of the to-be-migrated data read from the node 3 is less than the version number of the data read from the node 1, it is considered that the data of the first service read by the node 4 from the disk 6 of the node 3 is old data. Therefore, the read data of the first service is discarded.

It should be noted that the to-be-migrated data read by the node 4 from the disk 6 may include data of different services. For example, data of first 5 MB in data of 10 MB belongs to the first service, and data of last 5 MB in the data of 10 MB belongs to a second service. If the node 4 determines that the version number of the data of the first service read from the node 3 is different from the version number of the data of the first service read from the node 1, but a version number of data of a second service read from the node 3 is the same as a version number of data of a second service read from the node 1, the node 4 discards only the read data that is of the first service and that is in the to-be-migrated data. For example, the node 4 discards the data of first 5 MB in the data of 10 MB, and writes the data of last 5 MB in the data of 10 MB into the disk 7.

Then, the node 4 continues to read the to-be-migrated data from the disk 6 by using the foregoing method until data migration is completed.

In the foregoing embodiment, the deletion operation instruction and the rewrite operation instruction are used as an example to describe impact of different operation instructions on a version number of data stored in the clustered storage system. However, when the operation instruction is delivered at different moments, a result of reading, by the node 4 from the at least one third node, the version number of the data that belongs to the same service as the to-be-migrated data is also affected. The following describes a data migration process of the clustered storage system by using an example in which the operation instruction and the version number of the data that belongs to the same service as the to-be-migrated data and that is read by the node 4 from the at least one third node are concurrent.

Figure 6:
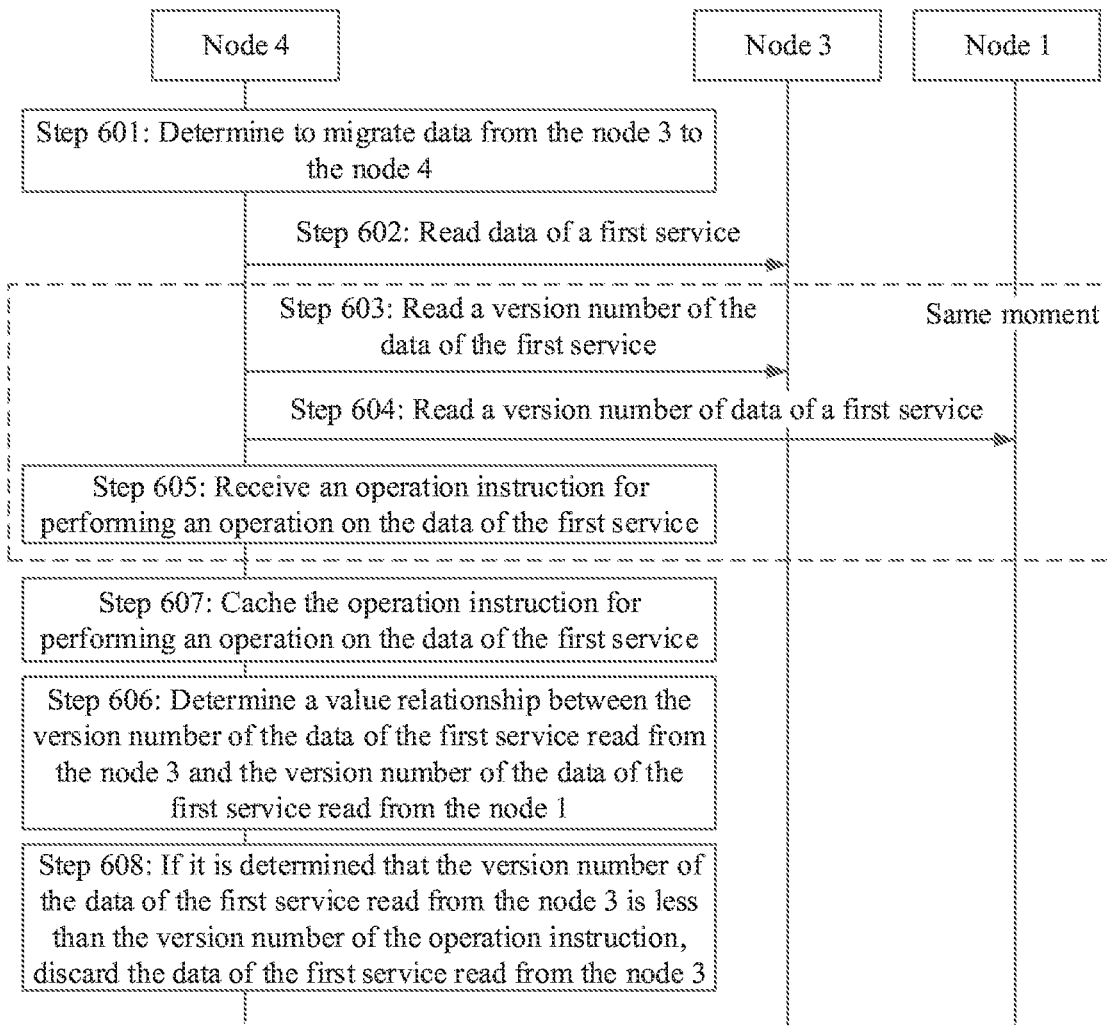
FIG. 6 is a flowchart of still another example of a data migration method according to an embodiment of this disclosure.

FIG. 6 is a flowchart of a data migration method according to an embodiment of this disclosure. A procedure includes the following steps.

Step 601: A first node determines that a second node migrates data to the first node.

Step 602: A node 4 reads to-be-migrated data from a node 3.

Step 603: The node 4 reads a version number of the to-be-migrated data from the node 3.

Step 604: The node 4 reads, from at least one third node, a version number of data that belongs to a same service as the to-be-migrated data.

Step 601 to step 604 are the same as step 401 to step 404, and details are not described herein.

Step 605: The node 4 receives an instruction delivered by a user for performing an operation on data of a first service.

An example in which the node 4 receives the instruction at a same moment at which a version number of the data of the first service is read from the node 1, and the instruction may be a deletion instruction used to instruct to delete the data of the first service or a rewrite instruction used to instruct to rewrite the data of the first service is used for description.

When the node 4 receives the instruction, the node 1 to the node 3 also receive the instruction. Because step 604 and step 605 are performed simultaneously, the node 1 has not performed any operation on the data of the first service, and the node 4 has read the data of the first service from the node 1. In this case, the version number that is of the data of the first service and that is read by the node 4 from the node 1 is still a version number before the operation is performed. For example, if the version number of the data of the first service before the operation is performed is 2, the version number that is of the data of the first service and that is obtained in step 604 is 2.

Step 606: The node 4 determines a value relationship between the version number of the to-be-migrated data read from the node 3 and the version number of the data read from the node 1.

An example in which an execution result of step 604 is that the version number of the data of the first service is 2, and to-be-migrated data read by the node 4 from a disk 6 of the node 3 is the data of the first service is used. Because data in the disk 6 needs to be migrated to a disk 7, the node 3 does not deliver the received instruction to the disk 6. Therefore, a version number of data of a first service in the disk 6 is a version number before an operation is performed. For example, the version number of the data of the first service before the operation is performed is 2, and the version number that is of the data of the first service and that is read by the node 4 from the node 1 is 2. In this case, the node 4 determines that the version number of the to-be-migrated data read from the node 3 is the same as the version number of the data read from the node 1.

It should be noted that the to-be-migrated data read by the node 4 from the disk 6 may include data of different services.

For example, data of first 5 MB in data of 10 MB belongs to the first service, and data of last 5 MB in the data of 10 MB belongs to a second service. In this case, the node 4 needs to separately determine version numbers of the data of the different services. A specific determining manner is the same as that in step 404, and details are not described herein.

Step 607: The node 4 caches the received operation instruction.

In this embodiment of this disclosure, caching the operation instruction is caching an operation version number carried in the operation instruction and/or a start offset and a data length that are of the data corresponding to the first service and that are indicated by the operation instruction. A cache time may be 20 s, 30 s, or the like, or certainly may be another duration. This is not limited herein. In this way, when duration for caching the operation instruction reaches the cache time, the operation instruction may be automatically deleted, to release cache space.

It should be noted that step 607 may be performed before step 606, or may be performed after step 606. This is not limited herein. In FIG. 6, an example in which step 607 is performed before step 606 is used.

Step 608: When determining that the version number of the to-be-migrated data read from the node 3 is less than the cached operation version number carried in the operation instruction, the node 4 discards the to-be-migrated data read from the node 3.

When the node 4 determines that the version number that is of the data of the first service and that is read from the node 3 is the same as the version number of the data read from the node 1, the node 4 compares the version number of the data of the first service read from the node 3 with the cached operation version number of the operation instruction. For example, the version number that is of the data of the first service and that is obtained in step 604 is 2, and the cached operation version number of the operation instruction is 3. The node 4 determines that the version number of the to-be-migrated data is less than the operation version number of the operation instruction, thereby determining that the to-be-migrated data is old data, and discarding the to-be-migrated data.

It should be noted that the to-be-migrated data read by the node 4 from the disk 6 may include data of different services. For example, the data of first 5 MB in the data of 10 MB belongs to the first service, and the data of last 5 MB in the data of 10 MB belongs to the second service. In this case, the node 4 may determine, based on a start location and an end location of the to-be-migrated data read from the node 3 and the start offset and the data length that are of the data and that are indicated in the cached operation instruction, whether the to-be-migrated data read from the node 3 is data to be operated by the operation instruction. To be specific, the node 4 determines whether the start location and the end location of to-be-migrated data read from node 3 are located between the start offset indicated by the operation instruction and an offset corresponding to a sum of the start offset and the data length. If the to-be-migrated data read from the node 3 is the data to be operated by the operation instruction, the to-be-migrated data read from the node 3 is the data to be operated by the operation instruction. For example, the node 4 determines that the data to be operated by the operation instruction is only the data of first 5 MB in the data of 10 MB, to write the data of last 5 MB (namely, data of the second service) in the data of 10 MB into the disk 7. Then, the node 4 determines a value relationship between the operation version number of the operation instruction and the version number that is of the data of the first service and that is read from the node 3. It can be learned from the relationship between the version number of the operation instruction and the version number of the corresponding data that is described in step 608 that because the disk 6 does not receive the operation instruction, the version number that is of the data of the first service and that is read from the node 3 is less than the operation version number of the operation instruction. Therefore, the node 4 discards the to-be-migrated data.

Then, the node 4 continues to read the to-be-migrated data from the disk 6 by using the foregoing method until data migration is completed.

In the foregoing technical solution, the operation instruction is cached, for example, cached for 30 s, on the node on which the target disk to which data is migrated is located. In this way, even if the version number of to-be-migrated data and the operation instruction are read concurrently, the node on which the target disk to which data is migrated is located reads a version number of deleted data or a version number of data before rewriting. The node on which the target disk to which data is migrated may also discard the deleted or rewritten data according to the cached operation instruction, to resolve data remanence caused by concurrency. This can reduce waste of ineffective migration and subsequent deletion of I/O resources, reduce impact of a data migration process on a service, and improve migration performance and reliability.

In addition, it should be noted that the trusted state may alternatively be applied to a metadata recovery scenario, a node/disk failover scenario, or a scenario of determining validity of read service data. For example, in the metadata recovery scenario, when data in a disk is faulty, a disk in the trusted state may be determined from another disk, and then metadata recovery is performed based on data in the disk in the trusted state. This can ensure reliability of the recovered metadata. In the node/disk failover scenario, when a node/disk is faulty, a node/disk in the trusted state may be determined from another node/disk, and then a fault is transferred to the node/disk in the trusted state. This can ensure service continuity. In other scenarios, application methods of the trusted state are similar, and are not described one by one herein.

In the foregoing embodiments provided in this disclosure, the methods provided in the embodiments of this disclosure are separately described from a perspective of interaction between the first node, the second node, and the at least one third node. To implement functions in the method provided in the embodiments of this disclosure, the first node may include a hardware structure and/or a software module, to implement the functions by using the hardware structure, the software module, or a combination of the hardware structure and the software module. A function in the functions is performed in a manner of the hardware structure, the software module, or a combination of the hardware structure and the software module, depending on a specific application and a design constraint condition of the technical solution.

Figure 7:
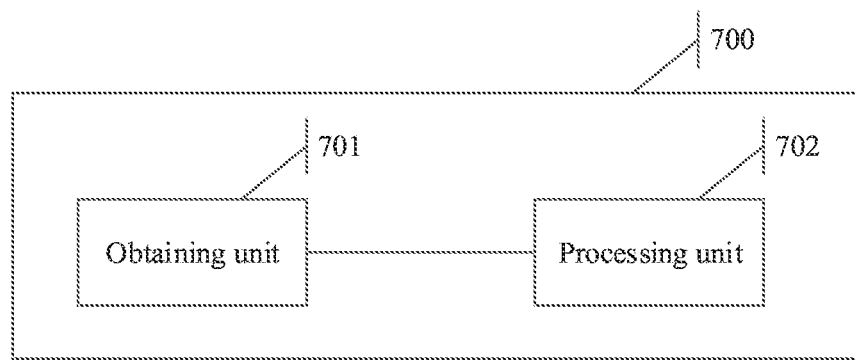
FIG. 7 is a schematic structural diagram of a data migration apparatus according to an embodiment of this disclosure.

FIG. 7 is a schematic structural diagram of a data migration apparatus 700. The data migration apparatus 700 may be a first node, and can implement a function of the first node in the method provided in the embodiments of this disclosure. Alternatively, the data migration apparatus 700 may be an apparatus that can support a first node in implementing a function of the first node in the method provided in the embodiments of this disclosure. The data migration apparatus 700 may be a hardware structure, a software module, or a combination of a hardware structure and a software module. The data migration apparatus 700 may be implemented by a chip system. In this embodiment of this disclosure, the chip system may include a chip, or may include a chip and another discrete component.

The data migration apparatus 700 may include an obtaining unit 701 and a processing unit 702.

The obtaining unit 701 may be configured to perform step 402 and step 405 in the embodiment shown in FIG. 4, and/or configured to perform step 502 and step 505 in the embodiment shown in FIG. 5, and/or configured to perform step 602 and step 605 in the embodiment shown in FIG. 6, and/or configured to support another process of the technology described in this specification. The obtaining unit 701 is configured by the data migration apparatus 700 to communicate with another module, and may be a circuit, a component, an interface, a bus, a software module, a transceiver, or any other apparatus that can implement communication.

The processing unit 702 may be configured to perform step 401, step 403, step 404, step 406, and step 407 in the embodiment shown in FIG. 4, and/or configured to perform step 501, step 503, step 504, step 506, and step 507 in the embodiment shown in FIG. 5, and/or configured to perform step 601, step 603, step 604, and step 606 to step 608 in the embodiment shown in FIG. 6, and/or configured to support another process of the technology described in this specification.

All related content of the steps in the foregoing method embodiments may be cited in function descriptions of corresponding functional modules. Details are not described herein.

In the embodiments of this disclosure, division into the modules is an example, and is merely logical function division. In an actual implementation, there may be another division manner. In addition, functional modules in the embodiments of this disclosure may be integrated into one processor, or each of the modules may exist alone physically, or two or more modules may be integrated into one module. The integrated module may be implemented in a form of hardware, or may be implemented in a form of a software functional module.

Figure 8:
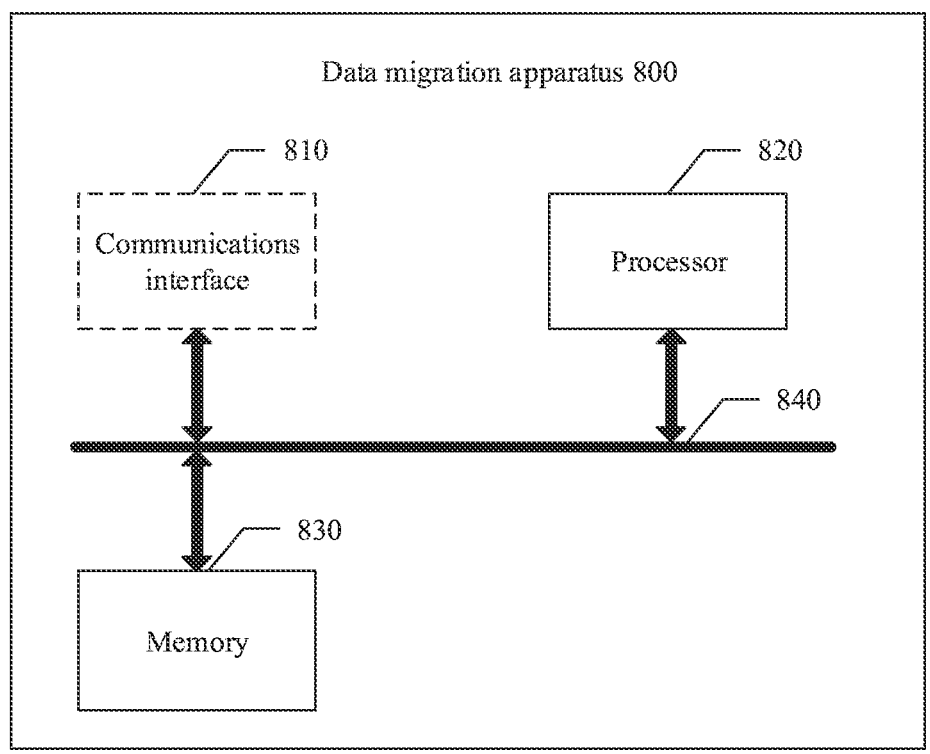
FIG. 8 is another schematic structural diagram of a data migration apparatus according to an embodiment of this disclosure.

FIG. 8 shows a data migration apparatus 800 according to an embodiment of this disclosure. The data migration apparatus 800 may be the first node in the embodiment shown in FIG. 4, FIG. 5, or FIG. 6, and can implement a function of the first node in the embodiment shown in FIG. 4, FIG. 5, or FIG. 6 of this disclosure. Alternatively, the data migration apparatus 800 may be an apparatus that can support the first node in implementing a function of the first node in the method provided in the embodiment shown in FIG. 4, FIG. 5, or FIG. 6 of this disclosure. The data migration apparatus 800 may be a chip system. In this embodiment of this disclosure, the chip system may include a chip, or may include a chip and another discrete component.

The data migration apparatus 800 includes at least one processor 820, configured to implement or support the data migration apparatus 800 in implementing the function of the first node in the embodiment shown in FIG. 4, FIG. 5, or FIG. 6 of this disclosure. For example, the processor 820 may read a version number of data of a first service from a second node or read a version number of data of a first service from at least one third node. For details, refer to the detailed descriptions in the method examples. Details are not described herein.

The data migration apparatus 800 may further include at least one memory 830, configured to store a program instruction and/or data. The memory 830 is coupled to the processor 820. The coupling in this embodiment of this disclosure is an indirect coupling or a communication connection between apparatuses, units, or modules, may be in an electrical form, a mechanical form, or another form, and is used for information exchange between the apparatuses, the units, or the modules. The processor 820 may operate with the memory 830 together. The processor 820 may execute the program instruction stored in the memory 830. At least one program instruction of the at least one memory may be included in the processor. When executing the program instruction in the memory 830, the processor 820 can implement the methods shown in FIG. 4 to FIG. 6.

The data migration apparatus 800 may further include a communications interface 810, configured to communicate with another device through a transmission medium, so that an apparatus in the data migration apparatus 800 can communicate with the another device. For example, the another device may be a client. The processor 820 may send and receive data through the communications interface 810.

In this embodiment of this disclosure, a specific connection medium between the communications interface 810, the processor 820, and the memory 830 is not limited. In this embodiment of this disclosure, the memory 830, the processor 820, and the communications interface 810 are connected by using a bus 840 in FIG. 8, where the bus is represented by a thick line in FIG. 8. A connection manner between other components is schematically described, and is not limited herein. The bus may be classified into an address bus, a data bus, a control bus, and the like. For ease of representation, only one thick line is used to represent the bus in FIG. 8, but this does not mean that there is only one bus or only one type of bus.

In this embodiment of this disclosure, the processor 820 may be a general-purpose processor, a digital signal processor, an application-specific integrated circuit (ASIC), a field programmable gate array (FPGA) or another programmable logic device, a discrete gate or transistor logic device, or a discrete hardware component, and may implement or execute the methods, steps, and logical block diagrams disclosed in the embodiments of this disclosure. The general-purpose processor may be a microprocessor or any conventional processor or the like. The steps of the method disclosed with reference to the embodiments of this disclosure may be directly performed by a hardware processor, or may be performed by using a combination of hardware in the processor and a software module.

In this embodiment of this disclosure, the memory 830 may be a non-volatile memory, for example, a hard disk drive (HDD) or a solid-state drive (SSD), or may be a volatile memory, for example, a random-access memory (RAM). The memory is any other medium that can carry or store expected program code in a form of an instruction or a data structure and that can be accessed by a computer, but is not limited thereto. The memory in this embodiment of this disclosure may alternatively be a circuit or any other apparatus that can implement a storage function, and is configured to store a program instruction and/or data.

An embodiment of this disclosure further provides a computer-readable storage medium including an instruction. When the instruction is run on a computer, the computer is enabled to perform the methods implemented by the first node in the embodiments shown in FIG. 4 to FIG. 6.

An embodiment of this disclosure further provides a computer program product including an instruction. When the instruction is run on a computer, the computer is enabled to perform the methods implemented by the first node in the embodiments shown in FIG. 4 to FIG. 6.

An embodiment of this disclosure provides a chip system. The chip system includes a processor, may further include a memory, and is configured to implement a function of the first node in the foregoing methods. The chip system may include a chip, or may include a chip and another discrete component.

All or some of the methods in the embodiments of this disclosure may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this disclosure are all or partially generated. The computer may be a general-purpose computer, a special-purpose computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

Obviously, a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A method, comprising:
    obtaining, by a first node from a second node, to-be-migrated data and a version number of the to-be-migrated data;
    obtaining, by the first node from a third node, a version number of data that belongs to a same first service as the to-be-migrated data, wherein the data of the first service is distributively stored in the second node and the third node; and
    discarding, by the first node, the to-be-migrated data read from the second node when the first node determines that the version number of the to-be-migrated data obtained from the second node is different from the version number of the data obtained from the third node.

2. The method according to claim 1, the method further comprises:
    before the obtaining, by the first node from the third node, the version number of the data:
        receiving, by the first node, a deletion instruction, wherein the deletion instruction instructs the first node and the third node to delete the data corresponding to the first service, wherein the version number of the to-be-migrated data obtained from the second node is a positive integer, and wherein the version number of the data does not exist.

3. The method according to claim 1, the method further comprises:
    before the obtaining, by the first node from the third node, the version number of the data:
        receiving, by the first node, a rewrite instruction, wherein the rewrite instruction instructs the first node and the third node to rewrite the data corresponding to the first service, and wherein the version number of the data obtained from the third node is greater than the version number of the to-be-migrated data obtained from the second node.

4. The method according to claim 1, the method further comprises:
    receiving, by the first node, an operation instruction while obtaining from at least the third node, the version number of the data that belongs to the same first service as the to-be-migrated data, wherein the operation instruction instructs the first node and the third node to delete or rewrite the data corresponding to the first service;
    caching, by the first node, an operation version number in the operation instruction; and
    discarding, by the first node, the to-be-migrated data read from the second node when the version number of the to-be-migrated data obtained from the second node is less than the operation version number.

5. The method according to claim 4, the method further comprises:
    before the receiving the operation instruction:
        reading, by the first node, the data from the third node.

6. The method according to claim 1, wherein the method further comprises:
    determining, by the first node, that the third node is in a trusted state, wherein the trusted state is a state that a disk in the third node storing the data of the first service is not faulty, and the data of the first service stored in the disk is complete.

7. The method according to claim 1, wherein the method further comprises:
    determining, by the first node, the third node with a minimum load from a plurality of nodes in a trusted state, wherein the trusted state is a state that a disk storing the data of the first service is not faulty, and the data of the first service stored in the disk is complete.

8. A first apparatus, comprising:
    at least one processor; and
    a non-transitory computer readable storage medium storing programming, the programming including instructions for execution by the at least one processor, the programming including instructions to:
        obtain, from a second apparatus, to-be-migrated data and a version number of the to-be-migrated data;
        obtain, from a third apparatus, a version number of data that belongs to a same first service as the to-be-migrated data, wherein the data of the first service is distributively stored in the second apparatus and the third apparatus; and
        discard the to-be-migrated data read from the second apparatus when the version number of the to-be-migrated data obtained from the second apparatus is different from the version number of the data obtained from the third apparatus.

9. The first apparatus according to claim 8, wherein the programming further includes instructions to:
    before obtaining, from the third apparatus, the version number of the data:

receive a deletion instruction, wherein the deletion instruction instructs the first apparatus and the third apparatus to delete the data corresponding to the first service, wherein the version number of the to-be-migrated data obtained from the second apparatus is a positive integer; and wherein the version number of the data does not exist.

10. The first apparatus according to claim 8, wherein the programming further includes instructions to:
before obtaining, from the third apparatus, the version number of the data:
receive a rewrite instruction, wherein the rewrite instruction is for instructing the first apparatus and the third apparatus to rewrite the data corresponding to the first service, and wherein the version number of the data obtained from the third apparatus is greater than the version number of the to-be-migrated data obtained from the second apparatus.

11. The first apparatus according to claim 8, wherein the programming further includes instructions to:
receive an operation instruction while obtaining from at least the third apparatus, the version number of the data that belongs to the same first service as the to-be-migrated data, wherein the operation instruction instructs the first apparatus and the third apparatus to delete or rewrite the data corresponding to the first service;
cache an operation version number in the operation instruction; and
discard the to-be-migrated data read from the second apparatus when the version number of the to-be-migrated data obtained from the second apparatus is less than the operation version number.

12. The first apparatus according to claim 11, the programming further includes instructions to:
before receiving the operation instruction:
read the data from the third apparatus.

13. The first apparatus according to claim 8, wherein the programming further includes instructions to:
determine that the third apparatus is in a trusted state, wherein the trusted state is a state that a disk in the third apparatus storing the data of the first service is not faulty, and the data of the first service stored in the disk is complete.

14. The first apparatus according to claim 8, wherein the programming further includes instructions to:
determine the third apparatus with a minimum load from a plurality of apparatuses in a trusted state t, wherein the trusted state is a state that a disk storing the data of the first service is not faulty, and the data of the first service stored in the disk is complete.

15. A non-transitory computer-readable storage medium having instructions stored thereon that, when executed by a first node, cause the first node to perform operations, the operations comprising:
obtaining, from a second node, to-be-migrated data and a version number of the to-be-migrated data;
obtaining, from a third node, a version number of data that belongs to a same first service as the to-be-migrated data, wherein the data of the first service is distributively stored in the second node and the third node; and
discarding the to-be-migrated data read from the second node when the version number of the to-be-migrated data obtained from the second node is different from the version number of the data obtained from the third node.

16. The non-transitory computer-readable storage medium of claim 15, the operations further comprising:
before the obtaining, from the third node, the version number of the data:
receiving a deletion instruction, wherein the deletion instruction instructs the first node and the third node to delete the data corresponding to the first service, wherein the version number of the to-be-migrated data obtained from the second node is a positive integer, and wherein the version number of the data does not exist.

17. The non-transitory computer-readable storage medium of claim 15, the operations further comprising:
before the obtaining, by the first node from the third node, the version number of the data:
receiving a rewrite instruction, wherein the rewrite instruction instructs the first node and the third node to rewrite the data corresponding to the first service, and wherein the version number of the data obtained from the third node is greater than the version number of the to-be-migrated data obtained from the second node.

18. The non-transitory computer-readable storage medium of claim 15, the operations further comprising:
receiving an operation instruction while obtaining from at least the third node, the version number of the data that belongs to the same first service as the to-be-migrated data, wherein the operation instruction instructs the first node and the third node to delete or rewrite the data corresponding to the first service;
caching an operation version number in the operation instruction; and
discarding the to-be-migrated data read from the second node when the version number of the to-be-migrated data obtained from the second node is less than the operation version number.

19. The non-transitory computer-readable storage medium of claim 15, the operations further comprising:
determining that the third node is in a trusted state, wherein the trusted state is a state that a disk in the third node storing the data of the first service is not faulty, and the data of the first service stored in the disk for storing the data is complete.

20. The non-transitory computer-readable storage medium of claim 15, the operations further comprising:
determining the third node with a minimum load from a plurality of nodes in a trusted state, wherein the trusted state is a state that a disk storing the data of the first service is not faulty, and the data of the first service stored in the disk is complete.

* * * * *